(No Model.)
W. QUAYLE.
BEVEL.
No. 442,592.  Patented Dec. 9, 1890.
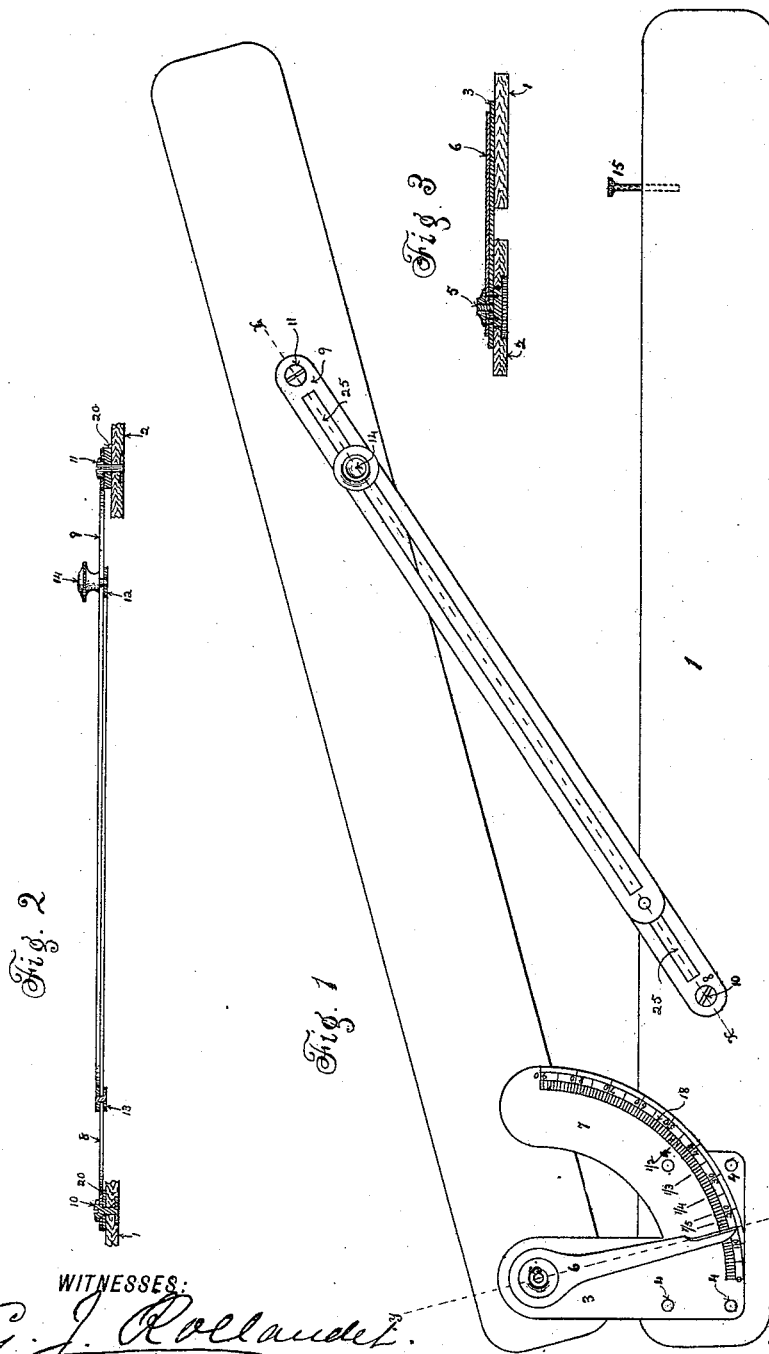
WITNESSES:
INVENTOR
William Quayle
BY
A. J. O'Brien
ATTORNEY.

UNITED STATES PATENT OFFICE.

WILLIAM QUAYLE, OF DENVER, COLORADO.

BEVEL.

SPECIFICATION forming part of Letters Patent No. 442,592, dated December 9, 1890.

Application filed July 16, 1890. Serial No. 358,988. (No model.)

*To all whom it may concern:*

Be it known that I, WILLIAM QUAYLE, a citizen of the United States of America, residing at Denver, in the county of Arapahoe and State of Colorado, have invented certain new and useful Improvements in Adjustable Angle Measures and Protractors; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improved form and construction of angle measure and protractor of the class for which Letters Patent of the United States numbered 390,705 were issued to me, and bearing date October 9, 1888.

My object is to provide an instrument of the class stated, which, though somewhat similar in form to my previous invention, shall at the same time possess the advantages of greater simplicity in construction, together with increased ease, facility, and accuracy of operation and adjustment.

My improved instrument, while more especially designed for the use of architectural draftsmen, will also be found a valuable acquisition to the instruments of many others engaged in the practice of mechanical drawing.

The construction and operation of my improved device will be readily understood by reference to the accompanying drawings, wherein is illustrated an embodiment of the invention.

Figure 1 is a plan view of my improved angle measure and protractor; Fig. 2, a section taken on the line *x x*, Fig. 1; and Fig. 3, a cross-section of the instrument, taken on the line *y y*, Fig. 1.

In the views, wherein similar reference-characters indicate corresponding parts, let the numerals 1 and 2 indicate, respectively, the two arms of the instrument. These arms are pivotally secured or hinged together near one extremity of each by the use of a suitable metal plate 3, which is rigidly secured to one arm—in this case to arm 1—in any suitable manner, as by the use of rivets or small screws 4, which pass through the arm and plates, as shown. Plate 3 is pivotally connected with arm 2 by means of a pin 5, which passes through the plate and arm. Pin 5 is made fast to arm 2 and also to a suitable index or pointer 6, set at right angles to arm 2 on the upper surface of the plate. Hence this arm and the pointer move simultaneously and maintain their relative positions, as stated.

Projecting from that portion of plate 3 which is riveted to arm 1 is a part 7, which is formed integral with the plate. Part 7 extends in the direction of arm 2, and its object is to form such an extension of plate 3 as to permit the forming thereon of a quadrant of a circle of suitable size, the center of pin 5 or the pivotal point of index 6 being the center of the circle. Let the numeral 18 denote the arc of this quadrant, upon which is formed a scale of angles suitably indicated at proper intervals between zero and ninety degrees. The index 6 is about the same length as the radius of the circle of which the quadrant is a part, so that the outer extremity of the index is quite close to the scale of angles.

To each of the arms 1 and 2 is pivotally secured one extremity of a slotted connecting-arm.

Let the numeral 8 designate the connecting-arm secured to arms 1 and the numeral 9 the connecting-arm pivoted to arm 2. Part 8 is pivoted to its respective arm at a point 10 and part 9 to its arm at a point 11. The pivotal end of each of these arms is slightly upraised by the use of a small lug or washer 20, placed between the main arm and the slotted arm secured thereto. These lugs or washers 20 are designed to prevent friction between the slotted and the main arms, and also to permit one connecting-arm to slide between the other similar arm and the main arm as the main arms approach each other during adjustment.

Each connecting-arm is provided with a longitudinal slot 25, in which travels a small guide block or pin secured to the inner or free extremity of the other connecting-arm— that is to say, part 8 is provided with a diminutive guide-block 12, traveling in the slot of arm 9 during the adjustment of arms 1 and 2, while to arm 9 is secured a pin 13, adapted to travel in the slot of arm 8 during said adjustment.

The guide-block is provided with a threaded aperture for the reception of the threaded part of a clamping-screw 14. The use of this clamping-screw is to secure the arms 1 and 2 in any desired position of adjustment by tightening the connecting-arms 8 and 9. Pin 13 is provided with a head or flange, which engages the lower surface of arm 8 and prevents the guide-pin from slipping out of position within its respective slot.

Arm 1 is provided with an adjustable screw-pin 15, inserted in an aperture formed at a suitable point in its inner edge, and, as shown in the drawings, near its outer extremity. This pin should be so adjusted that when the arms 1 and 2 are closed or made to approach each other the inner edge of arm 2 shall engage the head or outer extremity of pin 15 when the arms 1 and 2 are parallel. It will be observed that arms 1 and 2 in order to be operative must not be hinged close together, and that the projection of pin 15 from the edge of arm 1 marks the distance apart of arms 1 and 2 when they are made to approach each other until they occupy a parallel position.

The use of the instrument will be readily understood by all those accustomed to handling drafting-instruments. One of the main arms, as arm 1, is placed against a T-square or straight-edge as a base, while arm 2 is moved outward to form any desired angle or pitch with the base, as indicated by the pointer on the scale of angles and pitches. Arms 1 and 2 are easily and quickly adjusted when clamping-screw 14 is loosened, and may be placed at any desired angle with respect to each other between zero and ninety degrees.

Another useful feature of the device not heretofore referred to consists in a scale of roof-pitches, as one-half, one-third, one-fourth, &c., formed upon the quadrant 18. This scale of pitches is a convenience, and the use of the instrument with reference to it is the same as heretofore described. One of the main arms being on a straight-edge as a base, the other is moved outward therefrom until the pointer 6 indicates the pitch required, as one-half, one-fourth, one-third, or any other desired, the scale shown on the drawings ranging from one-half to one-sixth.

Having thus described my invention, what I claim is—

1. In an angle measure and protractor, the two main arms pivoted together near one end, one arm being provided with a plate rigidly secured thereto, upon which is marked a quadrant of a circle suitably graduated for the measurement of angles, the other arm being provided with an index or pointer rigidly secured thereto and extending at right angles to the arm to which it is secured, the index being secured to its arm at the pivotal point of connection between the two arms, the graduated quadrant-plate on the one arm being so located with reference to the index or pointer on the other arm that said pointer shall indicate the angle at which the arms stand to each other at any time during their adjustment, substantially as described.

2. In an angle measure and protractor, the two main arms pivotally connected near one extremity, one arm being provided with a graduated scale for the measurement of angles and the other arm with a suitable index or pointer, in combination with two slotted connecting-arms, one extremity of each being pivotally secured to each of the main arms, the opposite extremity of each connecting-arm being provided with a guide pin or block traveling in the slot of the other arm during the adjustment of the main arms, and a clamping-screw whereby the slotted arms are tightly secured and the main arms held at any desired angle with reference to each other, substantially as described.

3. In an angle measure and protractor, the main arms pivotally secured near one extremity, one of said arms being provided with a graduated quadrant for the measurement of angles, and the other arm with a suitable index or pointer, in combination with suitable means of connecting the two arms and maintaining them in any desired position during adjustment, and a pin inserted in the edge of one arm for the purpose of engaging the corresponding edge of the opposite arm as they approach each other, whereby the two arms remain parallel, substantially as described.

In testimony whereof I affix my signature in presence of two witnesses.

WILLIAM QUAYLE.

Witnesses:
JOHN WESTON,
WM. MCCONNELL.